(12) United States Patent
Taneya et al.

(10) Patent No.: US 6,681,803 B2
(45) Date of Patent: Jan. 27, 2004

(54) SOCKET AND PLUG ATTACHMENT MECHANISM FOR TUBE JOINT

(75) Inventors: Yoshimoto Taneya, Koshigaya (JP); Keiichirou Naito, Kitasoma-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/115,993

(22) Filed: Apr. 5, 2002

(65) Prior Publication Data

US 2002/0148514 A1 Oct. 17, 2002

(30) Foreign Application Priority Data

Apr. 12, 2001 (JP) ........................................ 2001-114211
Dec. 5, 2001 (JP) ........................................ 2001-371158

(51) Int. Cl.⁷ .............................................. F16L 37/32
(52) U.S. Cl. ................................. 137/614.03; 251/149.6
(58) Field of Search ...................... 137/614.03, 614.04, 137/614.05; 251/149.6

(56) References Cited

U.S. PATENT DOCUMENTS 5,406,980 A * 4/1995 Allread et al. ......... 137/614.03
5,494,073 A * 2/1996 Saito ...................... 137/614.03
5,709,243 A * 1/1998 Wells et al. ............ 137/614.03
6,283,443 B1   9/2001 Taneya .................... 251/149.6

FOREIGN PATENT DOCUMENTS

DE      28 26 344 A1   12/1979
JP          2604307      5/2000

OTHER PUBLICATIONS

Co–pending U.S. patent application Ser. No. 09/982,870, filed Oct. 22, 2001, Keiichirou Naito.
Note: Partial translation of pertinent portions of the Japanese citation is attached.

* cited by examiner

Primary Examiner—Kevin Lee
(74) Attorney, Agent, or Firm—Paul A. Guss

(57) ABSTRACT

An O-ring is disposed on a front end surface of an abutted collar to prevent a fluid from leaking out of a flow passage when a socket and a plug of a tube joint is coupled to one another. A check valve of each of the socket and the plug, which prevents an outflow of the fluid when the socket and the plug are disengaged from each other, comprises the cylindrical collar (plug body) and a valve element. The valve element is disposed toward an inner diameter of the collar. The valve element has an O-ring disposed on the outer circumference of a columnar section coaxial with the collar.

8 Claims, 15 Drawing Sheets

SOCKET AND PLUG ATTACHMENT MECHANISM FOR TUBE JOINT

BACKGROUND OF THE INVENTION

1. Field of the Invention

The present invention relates to a tube joint for a fluid. In particular, the present invention relates to a tube joint having a detachable mechanism comprising a socket and a plug.

2. Description of the Related Art

A general tube joint for a liquid having a detachable mechanism comprises check valves for both of a socket and a plug. Therefore, no liquid leaks when the plug is disengaged from the socket. For example, FIG. 14 shows a tube joint 500 comprising a socket 502 and a plug 552.

In the following description, as for each of the socket and the plug, the side on which the connection is made is referred to as "frontward direction" or "front end", and the opposite side on which the socket or the plug is connected to another tube passage (or a hose) is referred to as "rearward direction" or "rear end".

The socket 502 comprises, for example, a cylindrical socket body 504 which has a rear end opening 514 and a front end opening 528, a valve element 506 which has a tapered surface 506b, a pedestal 512 which has a plurality of through-holes, a cylindrical sleeve 520 which is disposed on the outer circumference of the socket body 504 on the front end side and which is fastened by a retaining ring 516 while being urged frontward by a coil spring 522, a plurality of steel balls 526 which are inserted into a plurality of holes each having a gradually reducing diameter near the front end of the socket body 504 and which are pressed by the inner circumferential surface of the sleeve 520, and an O-ring 524 which is disposed on the inner circumferential surface of the front end opening 528.

An annular seal member 510 is disposed on the tapered surface 506b of the valve element 506. One end of the coil spring 508 contacts the pedestal 512. The valve element 506 is urged frontward by the coil spring 508. The seal member 510 and the end surface of an annular projection 504a formed on the inner circumference of the socket body 504 contact each other to thereby function as a check valve which prevents the fluid from leaking frontward. Especially, even when the fluid pressure in the rear end opening 514 is high, the valve element 506 is pressed frontward by the fluid pressure. The liquid tightness (or air tightness) is kept because the tapered surface 506b is tightly inserted by force into the annular projection 504a.

A forward end surface 506a, which is disposed at the front end of the tapered surface 506b, abuts against the plug 552.

The plug 552 comprises a plug body 554, a valve element 556 which has a tapered surface 556b, and a pedestal 562 which has a plurality of through-holes.

The plug body 554 includes a rear end opening 564, an outer circumferential surface 554b which is disposed on the front end and which is inserted into the socket 502, and an annular groove 554a which functions as a disengagement stopper when the plug body 554 is joined to the socket 502.

An annular seal member 560 is disposed on the tapered surface 556b of the valve element 556. The valve element 556 is urged frontward by a coil spring 558 which has one end fixed to the pedestal 562. The seal member 560 contacts an annular projection 554c which protrudes in the inner circumferential direction at the forward end of the plug body 554 to thereby function as a check valve to prevent the fluid from leaking frontward. The liquid-tight function (or the air-tight function) is the same as the liquid-tight function (or the air-tight function) of the socket 502.

A flat forward end surface 556a at the forward end of the tapered surface 556b abuts against the socket 502.

When the socket 502 and the plug 552 are connected to one another, the force is applied to the rear of the sleeve 520 to move the sleeve 520. The pressing force applied to the steel balls 526 is released. Therefore, the outer circumferential surface 554b at the front end of the plug body 554 can be inserted into the front end opening 528 of the socket 502, while pushing the steel balls 526 out of the socket 502.

The respective forward end surfaces 506a, 556a of the valve elements 506, 556 of the socket 502 and the plug 552 abut each other. When the plug 552 is inserted deeply, the valve elements 506, 556 are moved relatively rearward with respect to the socket body 504 and the plug body 554 while compressing the coil springs 508, 558. Then, the both seal members 510, 560 are separated from the annular projections 504a, 554c to form a connecting flow passage 530 (see FIG. 15). Therefore, the rear end opening 514 of the socket 502 and the rear end opening 564 of the plug 552 are communicated with each other via the through-holes of the pedestals 512, 562 and the connecting flow passage 530. The front end outer circumferential surface 554b of the plug body 554 and the O-ring 524 tightly contact each other to thereby serve as the sealing. Consequently, no fluid leaks externally.

When the plug 552 is sufficiently inserted into the socket 502 and the force applied to the sleeve 520 is released, the sleeve 520 is urged by the elastic restoration of the coil spring 522 and is restored to the original position.

The steel balls 526 are pressed again by the sleeve 520 toward the central axis of the socket body 504. As a result, the steel balls 526 are engaged with the annular groove 554a of the plug body 554.

Owing to the engagement with the steel balls 526, the plug 552 is not disengaged from the socket 502. The socket 502 and the plug 552 are tightly coupled to one another.

In the tube joint 500, each of the socket 502 and the plug 552 uses the check valve mechanism using the tapered surface 506b, 556b of the valve element 506, 556. When the socket 502 is connected to the plug 552, each of the valve elements 506, 556 is moved toward the rear end opening 514, 564. Depending upon the amount of movement, the space of the connecting flow passage 530 is generated at the portion of the tapered surface 506b, 556b.

During the connection and the disengagement, a gap 532 is generated between the front end surface 554d of the plug body 554 and the end surface 504b which abuts against the front end surface 554d. The gap 532 is generated due to the discrepancy between the timing at which the O-ring 524 and the outer circumferential surface 554b contact each other to form the seal structure and the timing at which the O-ring 524 slides on the outer circumferential surface 554b to allow the front end surface 554d and the end surface 504b to abut (or separate).

When the socket 502 is disengaged from the plug 552 with the connecting flow passage 530 being filled with the fluid, the fluid is extruded by the respective tapered surfaces 506b, 556b. Further, the fluid is drawn by the gap 532 and leaks externally.

SUMMARY OF THE INVENTION

An object of the present invention is to provide a tube joint which prevents fluid from leaking in the tube joint when a socket and a plug are connected to and disengaged from each other.

Another object of the present invention is to provide a tube joint in which axial centers coincide with each other to effect correct connection when a socket and a plug are connected to one another.

According to the present invention, there is disposed a tube joint for a fluid, comprising a socket and a plug which is connected to and disengaged from the socket; wherein the socket or the plug comprises an outflow-preventive valve for closing a passage for the fluid with a cylindrical valve body which is coaxial with the socket or the plug and a valve element which is disposed in the valve body when the socket and the plug are disengaged from each other; and a first seal for sealing the socket and the plug before the valve body and the valve element are relatively moved when the socket and the plug are connected to one another.

Therefore, when the socket and the plug are coupled to or disengaged from each other, the fluid in the tube joint does not leak. Further, the interior of the tube joint is not contaminated by the external air.

The first seal may be disposed on an inner circumferential annular groove of the valve body of the socket.

The first seal may be disposed on an outer circumferential annular groove of the valve body of the plug.

A tapered surface, which is diametrally enlarged frontward, may be disposed at a front end of the valve body of the socket.

Accordingly, the axial center of the socket coincides with the axial center of the plug by the guiding action of the tapered surface for the correct connection.

The first seal may be disposed on at least one of end surfaces at which the socket and the plug abut with each other.

The valve bodies of the plug and the socket may tightly contact each other and the valve elements of the plug and the socket may tightly contact each other when the outflow-preventive valve closes the passage for the fluid when the socket and the plug are disengaged from each other. It is possible to prevent the fluid from externally leaking.

The socket or the plug may include a detachable mechanism for the socket and the plug which are coupled to and disengaged from each other.

The valve element may have a second seal on an outer circumference of a front end columnar section thereof. The second seal may be interposed by an inner circumferential surface of the valve body and an outer circumferential surface of the valve element when the socket and the plug are not coupled to one another. Accordingly, it is possible to prevent the outflow of the fluid.

The valve element may have a projection or a recess for adjusting an axial center of the socket or the plug. The projection or the recess is formed on an end surface of the valve element. The end surface thereof is coupled to the socket or the plug.

The tube joint may further comprise a cylindrical groove which is open rearward between an inner circumferential surface and an outer circumferential surface of the valve body. One end of an elastic member for urging the valve body in an axial direction of the socket or the plug may be inserted into the cylindrical groove.

Each of the socket and the plug may have, at each rear end thereof, a rear end joint section connected to another tube joint. A first connecting section for connecting a main body of the socket to the rear end joint section may have the same shape as that of a second connecting section for connecting a main body of the plug to the rear end joint section.

Each of the socket and the plug may have, at each rear end thereof, a rear end joint section connected to another tube joint. The rear end joint section may have a hexagonal cross section which is perpendicular to an axial center.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Embodiments of the tube joint according to the present invention will be explained below with reference to FIGS. 1 to 13. In the following description, as for each of the socket and the plug, the side on which the connection is made is referred to as "frontward direction" or "front end", and the opposite side on which the socket or the plug is connected to another tube passage (or a hose) is referred to as "rearward direction" or "rear end".

Figure 1:
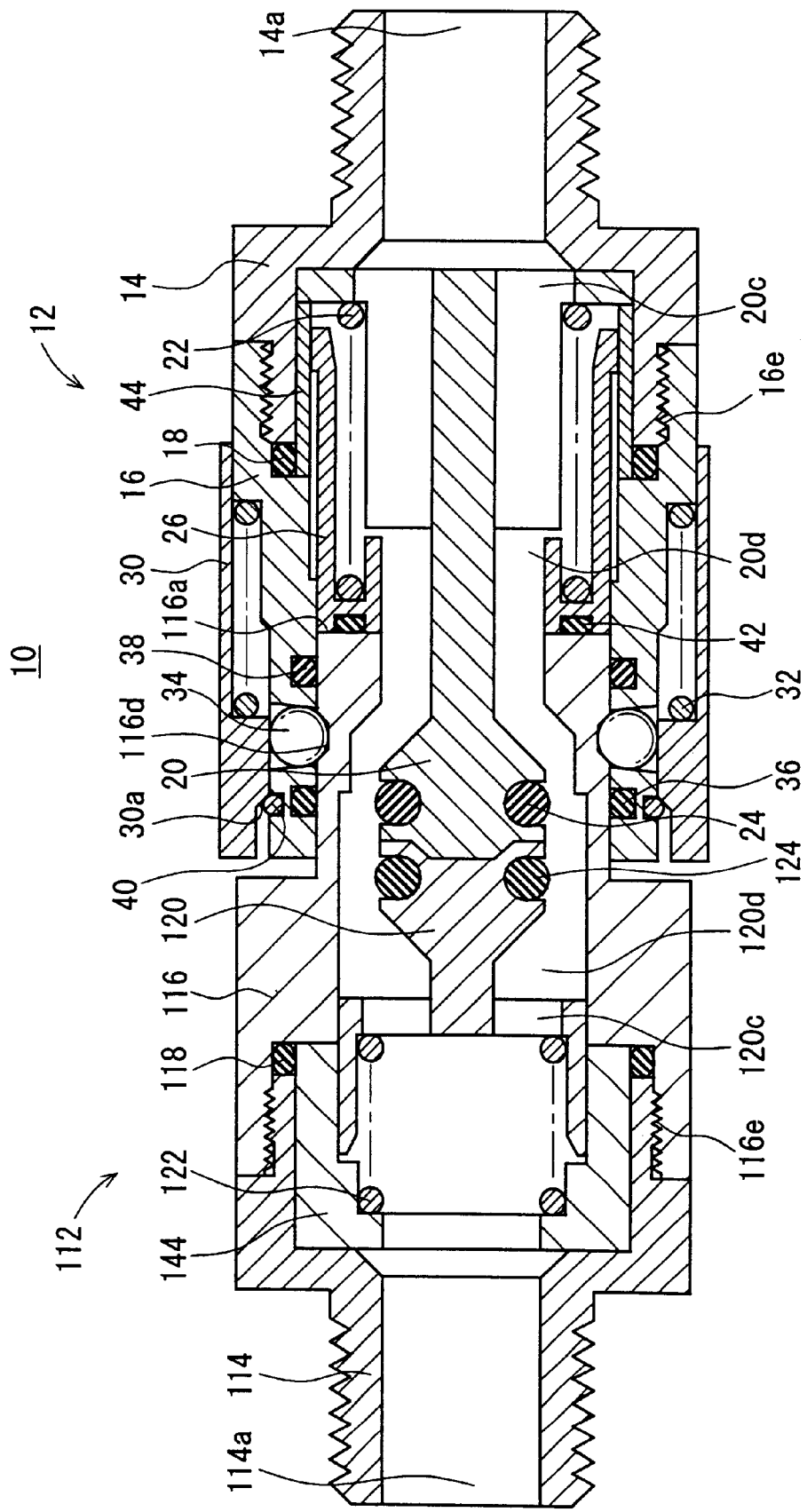
FIG. 1 is a sectional view illustrating a tube joint according to a first embodiment.

As shown in FIG. 1, a tube joint 10 according to a first embodiment comprises a socket 12 and a plug 112.

Figure 2:
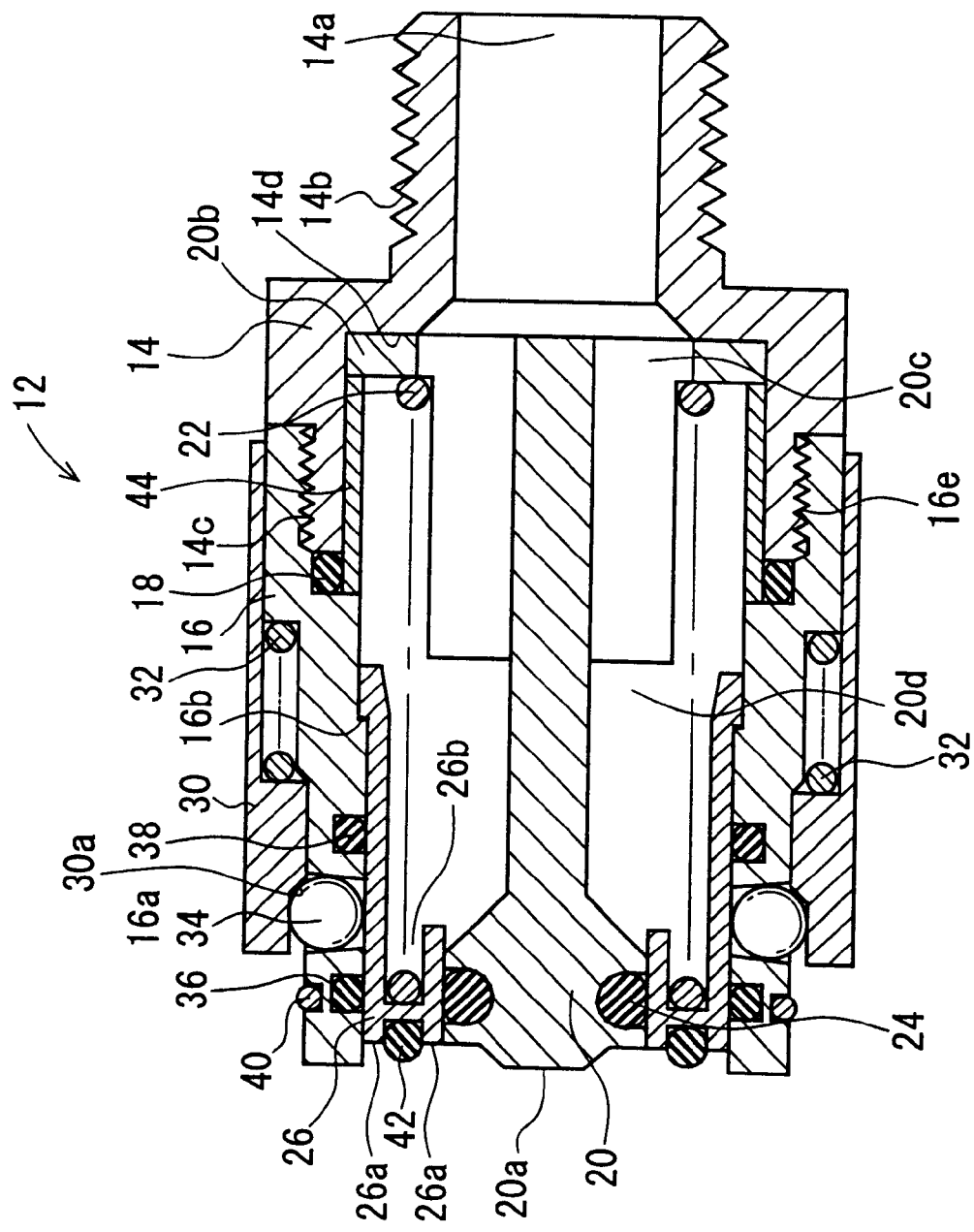
FIG. 2 is a sectional view illustrating a socket in the first embodiment.
Figure 3:
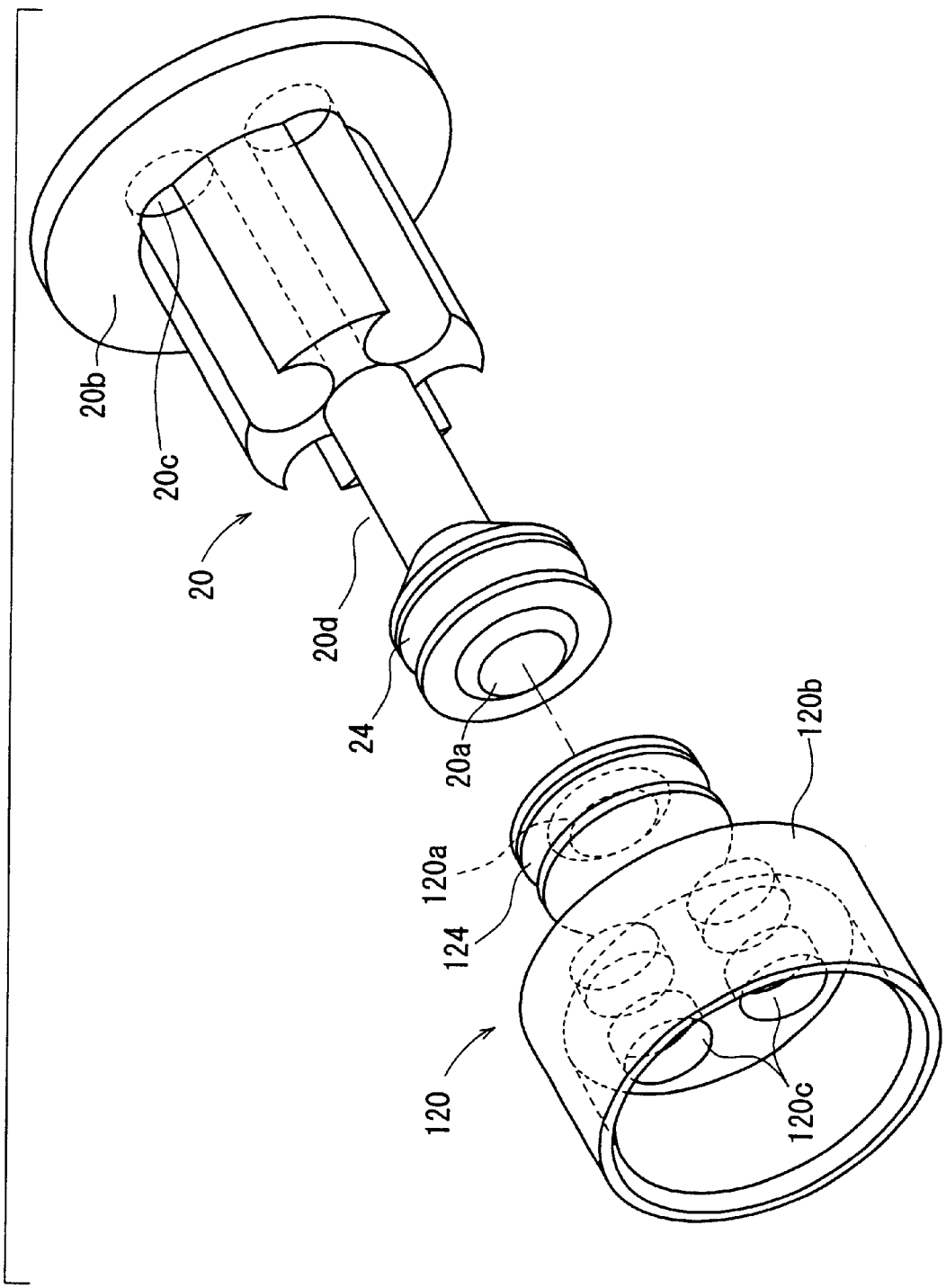
FIG. 3 is a perspective view illustrating a valve element in the first embodiment.

At first, explanation will be made with reference to FIG. 2 for the socket 12 disengaged from the plug 112.

The socket 12 includes, for example, a back body (rear end joint section) 14 which has a threaded groove 14c on the outer circumference of its front end and which has a step 14d at its inner circumference toward the radial direction, a cylindrical socket body (main body) 16 which is screwed over the threaded groove 14c of the back body 14, a valve element 20 which is coaxial with the axial center of the socket 12, a plurality of steel balls 34 which are inserted into a plurality of holes 16a each having a diameter gradually reduced near the front end of the socket body 16, a thin cylindrical sleeve 30 which is disposed near the outer front end of the socket body 16 and which is fastened by the steel balls 34 while being urged frontward by a coil spring 32, a collar (valve body) 26 which does not have substantially any gap between the inner circumferential surface of the socket body 16 and a front end columnar section of the valve element 20, and an O-ring (first seal) 42 which is inserted into a groove formed on a front end surface (end surface) 26a of the collar 26.

The back body 14 has, at its rear end, an opening 14a and a snap joint 14b connected to another joint. Only the back body 14 of the socket 12 may have a shape adapted to various tube passages to be connected.

A female screw (first connecting section) 16e is formed on the inner circumferential surface of the rear end of the socket body 16. The female screw 16e is screwed over the threaded groove 14c of the back body 14 to form the outer circumference of the socket 12. An annular gap is formed on the inner circumferential surface of the connecting portion between the socket body 16 and the back body 14. An O-ring 18, which prevents the fluid from leaking, is installed in the annular gap.

Two annular grooves are formed on the inner circumferential surface of front portions of the socket body 16. O-rings 36, 38 are attached to the annular grooves from the front end respectively. The O-rings 36, 38 are pressed by the outer circumferential surface of the collar 26 to keep the liquid tightness (or air tightness).

The plurality of holes 16a are formed between the O-rings 36, 38 at the front ends of the socket body 16. The steel balls 34 are inserted into the holes 16a. The steel balls 34 are supported by the outer circumferential surface of the collar 26 and protrude out of the socket body 16. The protruding portions abut against an inclined step 30a of the inner circumferential surface disposed near the front end of the sleeve 30 to serve as stoppers for the sleeve 30.

An annular groove is formed frontward from the hole 16a on the outer circumferential surface of the socket body 16. A stopper ring 40, which functions as a disengagement stopper for the sleeve 30 when the plug 112 is coupled, is disposed in the annular groove.

An annular disk-shaped projection 20b (see FIG. 3), which is disposed at the rear end of the valve element 20, abuts against the step 14d of the back body 14. A cylindrical guide 44 abuts against the front side of the annular disk-shaped projection 20b.

An annular and relatively large depression 20d is formed at the substantial center of the axis. A plurality of through-holes 20c, which serve as flow passages, are disposed rearward from the depression 20d. An O-ring (second seal) 24 is disposed in an annular groove which is formed on the outer circumference of the columnar section near the front end. The O-ring 24 is pressed (interposed) by the inner circumferential surface of the collar 26 to prevent the fluid from leaking.

A low projection 20a of a truncated cone shape is formed on the front end surface of the valve element 20 in order to adjust the axial center upon the connection with the plug 112.

The outer circumferential surface of the guide 44 tightly contacts the O-ring 18 and the inner circumferential surface of the back body 14. The inner circumferential surface of the guide 44 is flush with the inner circumferential surface of the socket body 16. The front end of the guide 44 abuts against the socket body 16. The guide 44 forms the sliding surface for the collar 26 together with the socket body 16. The guide 44 protects the O-ring 18 and fixes the valve element 20.

Each of the outer circumferential surface and the inner circumferential surface of the collar 26 is cylindrical and coaxial with, for example, the socket body 16. The collar 26 is disposed between the inner circumferential surface of the socket body 16 and the outer circumferential surface of the columnar section disposed on the front end of the valve element 20. A cylindrical groove 26b coaxial with the socket body 16 is disposed opposite to the front end surface 26a. One end of a coil spring (elastic member) 22 is inserted into the cylindrical groove 26b. The other end of the coil spring 22 abuts against the annular disk-shaped projection 20b of the valve element 20. The coil spring 22 urges the collar 26 frontward. The collar 26 is fastened by the projection 16b disposed on the inner circumferential surface of the socket body 16.

A grease is applied to an O-ring 42 which is inserted into a groove formed on the front end surface 26a of the collar 26. The adhesive power of the grease prevents the O-ring 42 from disengaging from the collar 26. The O-ring 42 may be disposed on the front end surface (end surface) 116a of the plug 112 opposed to the front end surface 26a.

Figure 4:
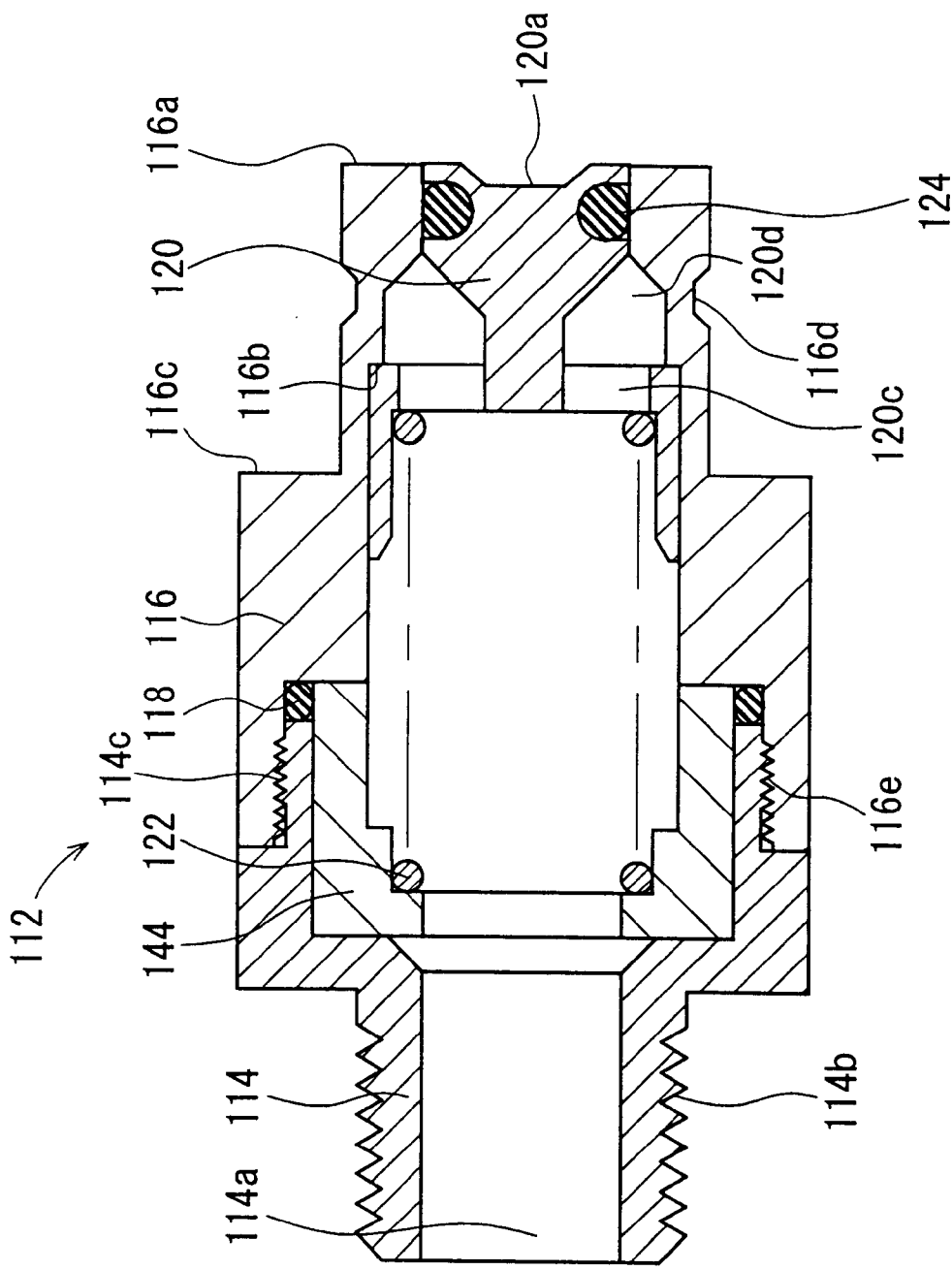
FIG. 4 is a sectional view illustrating a plug in the first embodiment.

Explanation will be made with reference to FIG. 4 for the plug 112 disengaged from the socket 12.

The plug 112 includes, for example, a back body (rear end joint section) 114 which has the same structure as that of the back body 14, a cylindrical plug body (valve body, main body) 116 which is screwed over a threaded groove 114c of the back body 114, and a valve element 120 which is coaxial with the axial center of the plug 112 and which has its outer circumferential surface without substantially any gap with respect to the inner circumferential surface of the plug body 116.

The back body 114 has the same structure as that of the back body 14. A snap joint 114b, which is disposed at the rear end of the back body 114, may be different from the snap joint 14b of the back body 14.

A female screw (second connecting section) 116e is formed on the inner circumferential surface of the rear end of the plug body 116. The female screw 116e is screwed over the threaded groove 114c of the back body 114 to integrally form the outer circumference of the plug 112. The female screw 116e has the same shape as that of the female screw 16e.

A portion of the plug body 116 rearward from a step 116c has a relatively large outer diameter. The other portion of the plug body 116 frontward from the step 116c has an outer diameter that is substantially the same as the outer diameter of the front end surface 26a of the collar 26. An annular groove 116d, which has a trapezoidal cross section and which is widely open on the outer diameter side, is formed frontward from the step 116c.

A flat front end surface 116a is formed at the front end of the plug body 116. The inner diameter and the outer diameter of the front end surface 116a are the same as the inner diameter and the outer diameter of the front end surface 26a of the collar 26 respectively.

An annular gap is formed on the inner circumferential surface of the connecting portion between the plug body 116 and the back body 114. An O-ring 118, which prevents the fluid from leaking, is attached to the annular gap. A cylindrical guide 144 is disposed on the inner circumference of the O-ring 118.

The valve element 120 has a section 120b which has a large diameter (see FIG. 3) and a columnar section which is disposed at the front end. An annular and relatively large depression 120d is formed between the section 120b and the columnar section. A plurality of through-holes 120c, which serve as flow passages, are disposed rearward from the depression 120d. An O-ring (second seal) 124 is disposed in an annular groove formed on the outer circumference near the front end. The O-ring 124 is pressed by the inner circumferential surface of the front end of the plug body 116 to keep the liquid tightness (or air tightness).

The outer diameter of the front end surface of the valve element 120 is the same as the outer diameter of the front end surface of the valve element 20. A shallow recess 120a of a truncated cone shape is formed on the front end surface of the valve element 120 to be fitted to the projection 20a without substantially any gap in order to mutually adjust the axial center upon the connection with the plug 112.

The outer circumferential surface of the guide 144 tightly contacts the O-ring 118 and the inner circumferential surface of the back body 114. The inner circumferential surface of the guide 144 is flush with the inner circumferential surface of the plug body 116, and its front end abuts against the plug body 116. The inner circumferential surface of the guide 144 forms the sliding surface for the valve element 120 together with the plug body 116. The inner circumferential surface of the guide 144 protects the O-ring 118. One end of the coil spring 122 is supported by an annular projection formed on the inner circumference.

The other end of the coil spring 122 abuts against the large diameter section 120b of the valve element 120 to urge the valve element 120 frontward. The valve element 120 is fastened by a projection 116b which is formed on the inner circumferential surface of the plug body 116.

Explanation will be made with reference to FIGS. 1, 5, and 6 for the operation to provide connection and disengagement for the socket 12 and the plug 112. A flexible hose tube passage is connected to each of the snap joints 14b, 114b of the socket 12 and the plug 112. The interior of each of the socket 12 and the plug 112 is previously filled with the fluid (liquid or gas).

Figure 5:
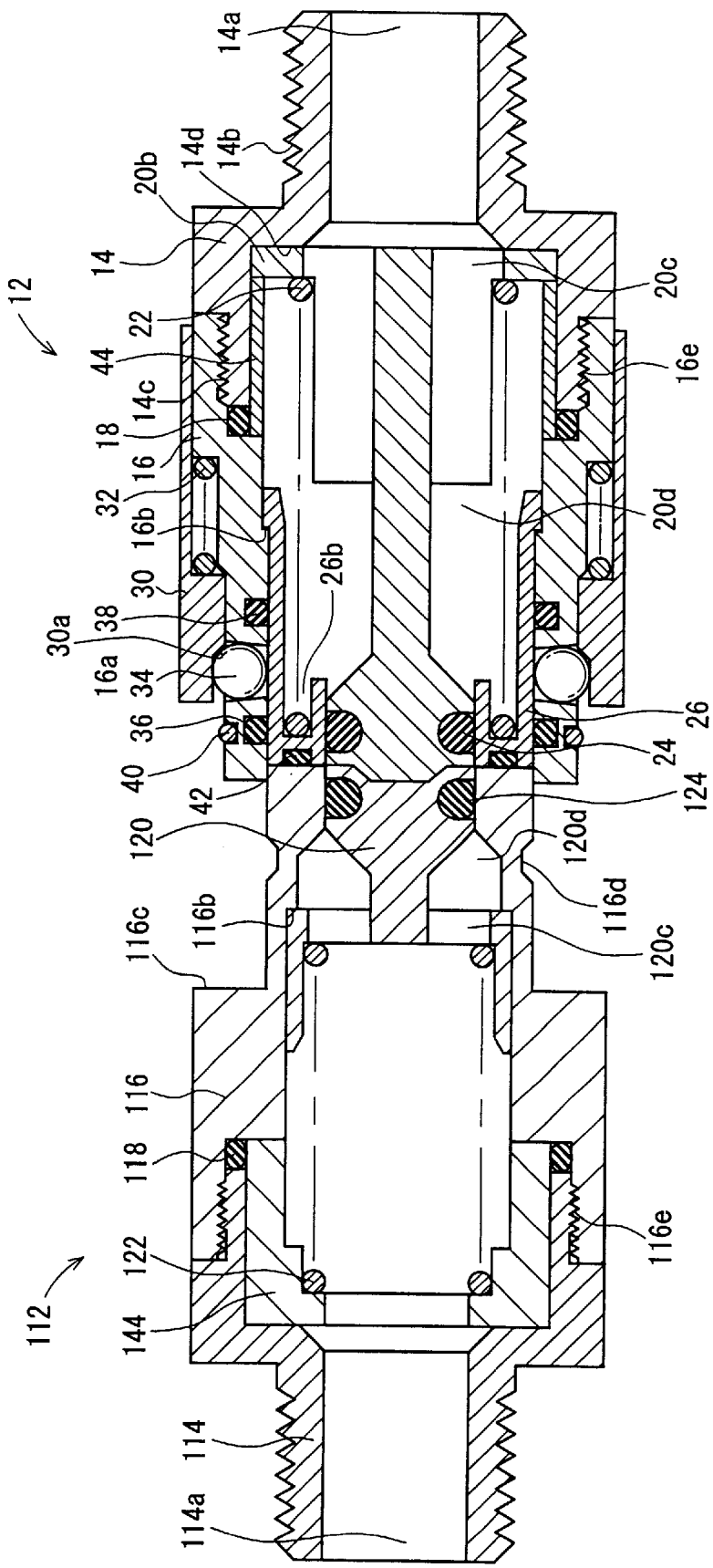
FIG. 5 illustrates an initial state for connecting the socket and the plug in the first embodiment.
Figure 6:
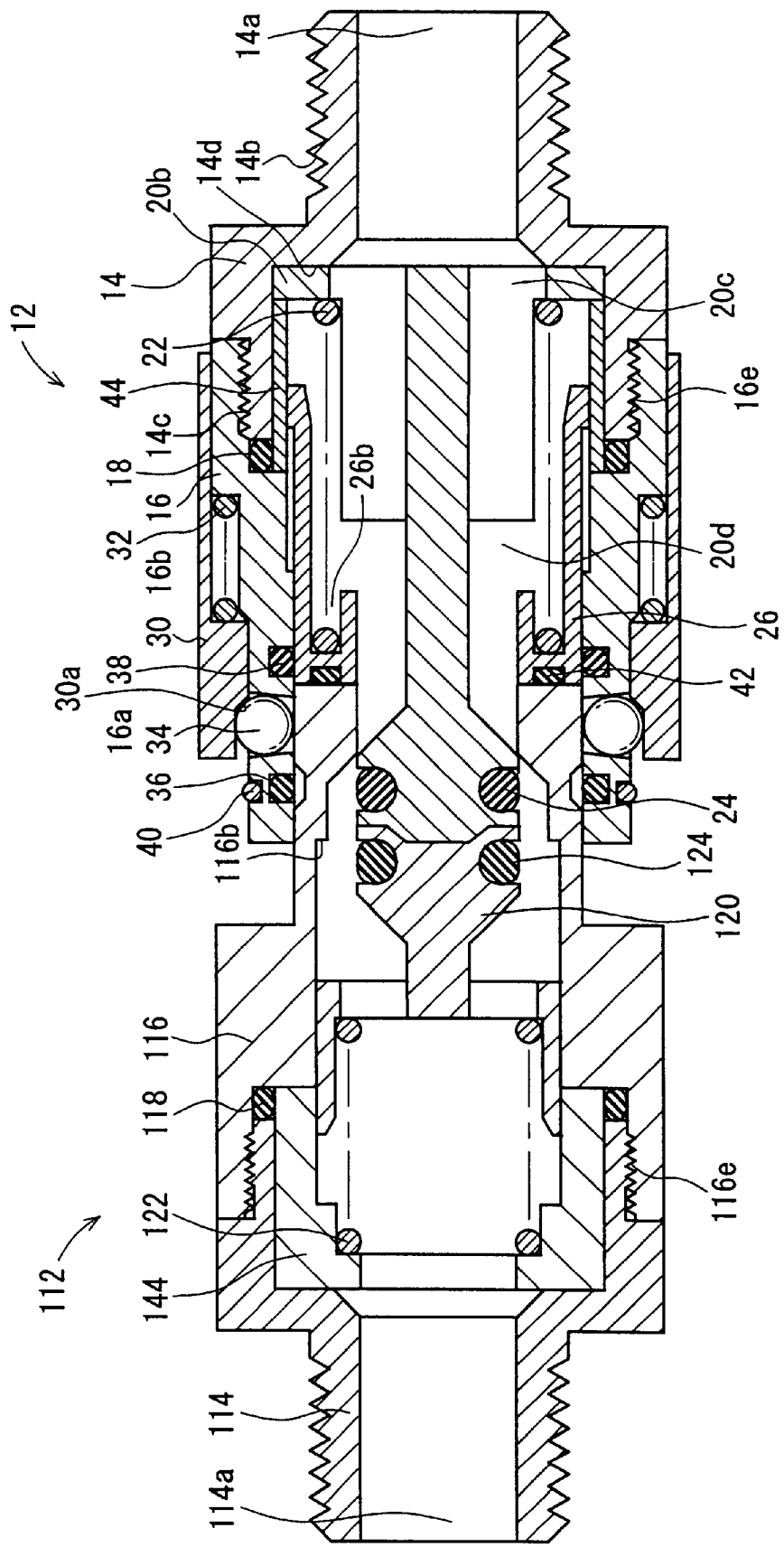
FIG. 6 illustrates an intermediate state-for connecting the socket and the plug in the first embodiment.

As shown in FIG. 5, the front end surface of the socket 12 abuts against the front end surface of the plug 112. The projection 20a formed on the front end surface of the valve element 20 is fitted to the recess 120a formed on the front end surface of the valve element 120. Therefore, the axial center is reliably adjusted.

The front end surface 116a of the plug body 116 presses and compresses the O-ring 42 which is disposed on the front end surface 26a of the collar 26. Therefore, the front end surface 116a abuts against the front end surface 26a.

The plug 112 is inserted into the socket 12. As shown in FIG. 6, when the front end surface 116a of the plug body 116 is inserted near the steel balls 34 of the socket 12, the collar 26 compresses the coil spring 22 to move rearward. The valve element 120 compresses the coil spring 122 to move rearward.

The O-ring 24 for keeping the liquid tightness (or air tightness) at the front of the socket 12 and the O-ring 124 for keeping the liquid tightness (or air tightness) at the front of the plug 112 are separated from the inner circumferential surface of the collar 26 and the inner circumferential surface of the plug body 116 respectively. The sealing function is disabled and the flow passage of the socket 12 is communicated with the flow passage of the plug 112. Then, the O-ring 42 externally effects the sealing function.

The tube passage is kept liquid-tight (or air-tight) by the O-rings 18, 38, 42, 118.

When the plug 112 is deeply inserted to completely couple the plug 112 to the socket 12, the front end surface 116a of the plug body 116 is inserted rearward from the O-ring 38 of the socket 12 as shown in FIG. 1. The collar 26 and the valve element 120 compress the coil spring 22 and the coil spring 122 respectively to move.

The outer circumferential surface of the collar 26 of the socket 12 slides from the inner circumferential surface of the socket body 16 to the inner circumferential surface of the guide 44. The sliding movement can be smooth because the inner circumferential surface of the socket body 16 is flush with the inner circumferential surface of the guide 44. The O-ring 18 is protected by the guide 44.

The guide 144 of the plug 112 has the function equivalent to that of the guide 44. The smooth sliding surface flush with the inner circumferential surface of the plug body 116 is formed to protect the O-ring 118.

The steel balls 34 are positioned in the annular groove 116d of the plug body 116. Therefore, the steel balls 34 are inwardly movable. The steel balls 34 are urged by the coil spring 32 and the inclined step 30a of the sleeve 30. The steel balls 34 are moved toward the inner diametral side by the inclined surface of the step 30a and are accommodated inward from the outer circumferential surface of the socket body 16.

When the steel balls 34 are accommodated inward from the socket body 16, the sleeve 30 is frontward moved. The sleeve 30 is fastened by the stopper ring 40 formed at the front position. The outer circumferences of the steel balls 34 are covered with the inner circumferential surface of the sleeve 30 to hold the steel balls 34 inward.

The steel balls 34 enter the annular groove 116d of the plug body 116. Therefore, the plug 112 is not disengaged from the socket 12.

A flow passage is formed between the opening 14a formed at the rear end of the socket 12 and the opening 114a formed at the rear end of the plug 112 via the through-holes 20c and the depression 20d of the valve element 20, and the depression 120d and the through-holes 120c of the valve element 120. The flow passage is kept liquid-tight (or airtight) by the O-rings 18, 38, 118.

The front end surface of the valve element 20 and the front end surface of the valve element 120 have the same outer diameter, and the entire surfaces tightly contact each other. Therefore, the areal size of the flow passage and the direction of the flow passage for the fluid flowing around the valve elements 20, 120 are constant. The pressure loss of the fluid scarcely occurs.

Explanation will be made for the operation to disengage the plug 112 from the socket 12.

When the force is applied to the sleeve 30 to move the sleeve 30 rearward, the steel balls 34 are movable outward. The steel balls 34 are urged by the coil springs 22, 122 and the inclined surface of the annular groove 116d of the plug body 116. Therefore, the steel balls 34 are extruded outward by the inclined surface of the annular groove 116d and protrude out of the socket body 16.

When the steel balls 34 protrude out of the annular groove 116d, the collar 26 is moved while extruding the plug body 116 frontward. The socket 12 is disengaged from the plug 112. The valve element 120 also extrudes the valve element 20 to be disengaged while being urged by the coil spring 122.

The front end surface 26a and the front end surface 116a tightly contact each other. The respective front end surfaces of the valve element 20 and the valve element 120 also tightly contact each other until they are disengaged, and no gap is formed therebetween. Therefore, no fluid leaks when the socket 12 is disengaged from the plug 112.

The fluid is not contaminated with the external air while the socket 12 is connected to the plug 112.

When the socket 12 is disengaged from the plug 112, the sleeve 30 is fastened by the steel balls 34 again and the sleeve 30 is located rearward.

Figure 7:
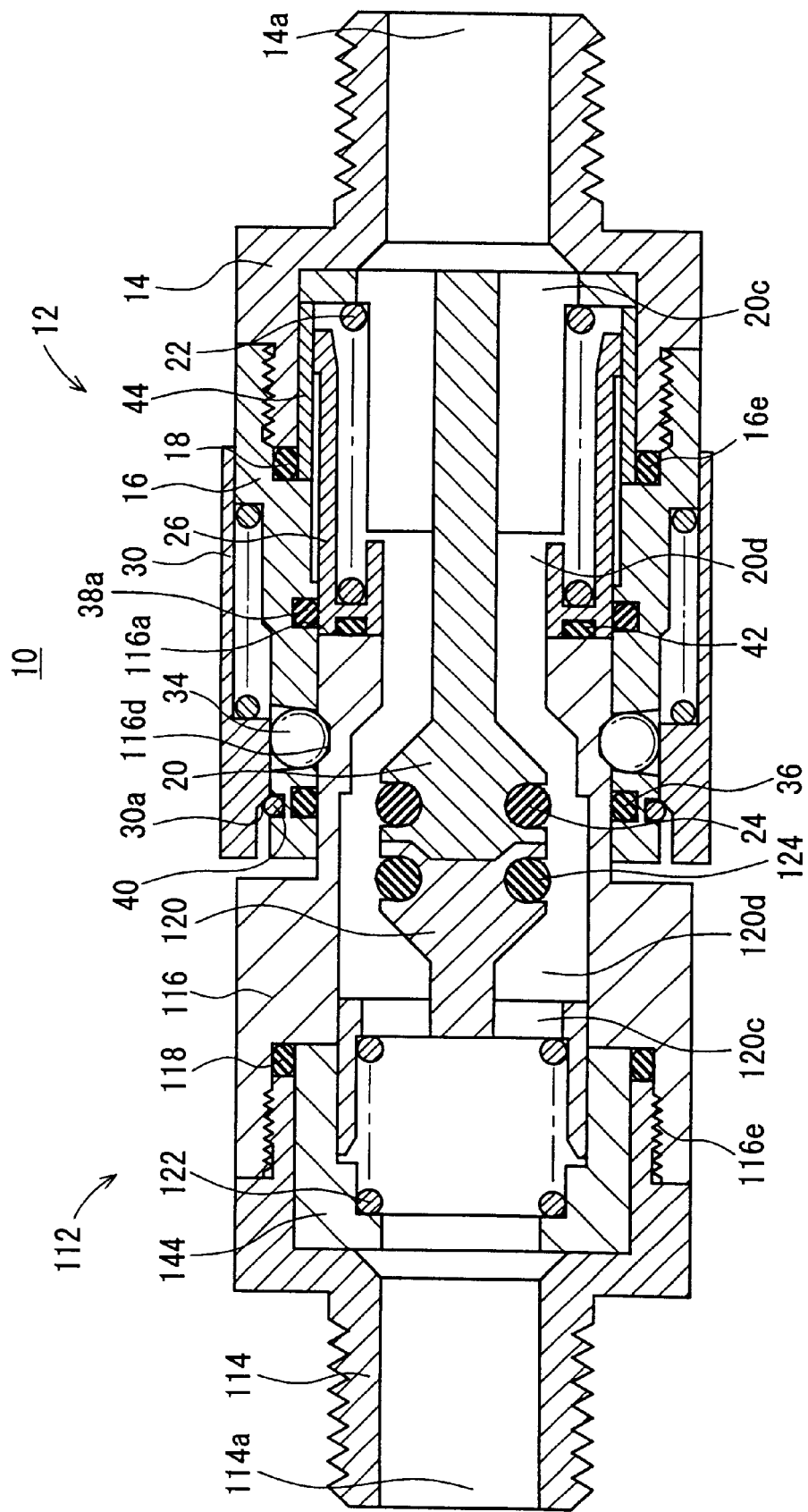
FIG. 7 illustrates an example in which the arrangement of an O-ring is changed in the first embodiment.

The first embodiment is illustrative of the case in which the internal fluid is kept in the liquid-tight manner (or in the air-tight manner) by the O-rings 18, 38, 118 when the socket 12 and the plug 112 are connected to one another. The O-ring 42 may be also used as one of the outflow-preventive means when the socket 12 and the plug 112 are coupled to one another. As shown in FIG. 7, when the O-ring 38 is located rearward from the front end surface 116a assuming that the O-ring 38 is designated as "O-ring 38a", then the fluid in the tube joint 10 is kept liquid-tight (or air-tight) by the O-rings 18, 38a, 118, 42 when the socket 12 and the plug 112 are connected to one another.

According to the tube joint 10 of the first embodiment, the end surfaces 26a, 116a, which are the connecting surfaces, tightly contact each other without axially sliding. Therefore, the front end surfaces of the valve element 20 and the valve element 120 also tightly contact each other. Therefore, the fluid is not contaminated with the external air when the socket 12 is connected to the plug 112.

When the socket 12 is disengaged from the plug 112, then there is no space for drawing the fluid with which the interior of the tube joint 10 is filled, and no fluid externally leaks because the front end surface 116a and the recess 120a tightly contact the front end surface 26a and the projection 20a respectively as shown in FIG. 5. Specifically, the fluid in the socket 12 is closed from the outside by the collar 26, the valve element 20, and the O-ring 24. The fluid in the plug 112 is also closed from the outside by the plug body 116, the valve element 120, and the O-ring 124. Therefore, no fluid leaks.

While the socket 12 and the plug 112 are attached and detached, the O-ring 42 prevents the internal fluid from externally leaking through the abutment surfaces of the front end surfaces 26a, 116a.

When the socket 12 is connected to the plug 112, then the front end surface of the valve element 20 and the front end surface of the valve element 120 have the identical outer diameter, and the entire surfaces tightly contact each other. Therefore, the areal size of the flow passage and the direction of the flow passage for the fluid flowing around the valve elements 20, 120 are constant. The pressure loss of the fluid scarcely occurs.

The O-ring 24, which keeps the liquid tightness (or air tightness) at the front end of the socket 12, is disposed on the valve element 20 as selected from the outer collar 26 and the inner valve element 20. Therefore, it is possible to change the shape of the outer collar 26. The groove 26b can be formed in the collar 26. The coil spring 22, which has a long natural length, can be used and inserted into the groove 26b. The groove 26b serves as a disengagement stopper for the coil spring 22.

A tube joint 300 according to a second embodiment will be explained with reference to FIGS. 8 to 13.

Figure 8:
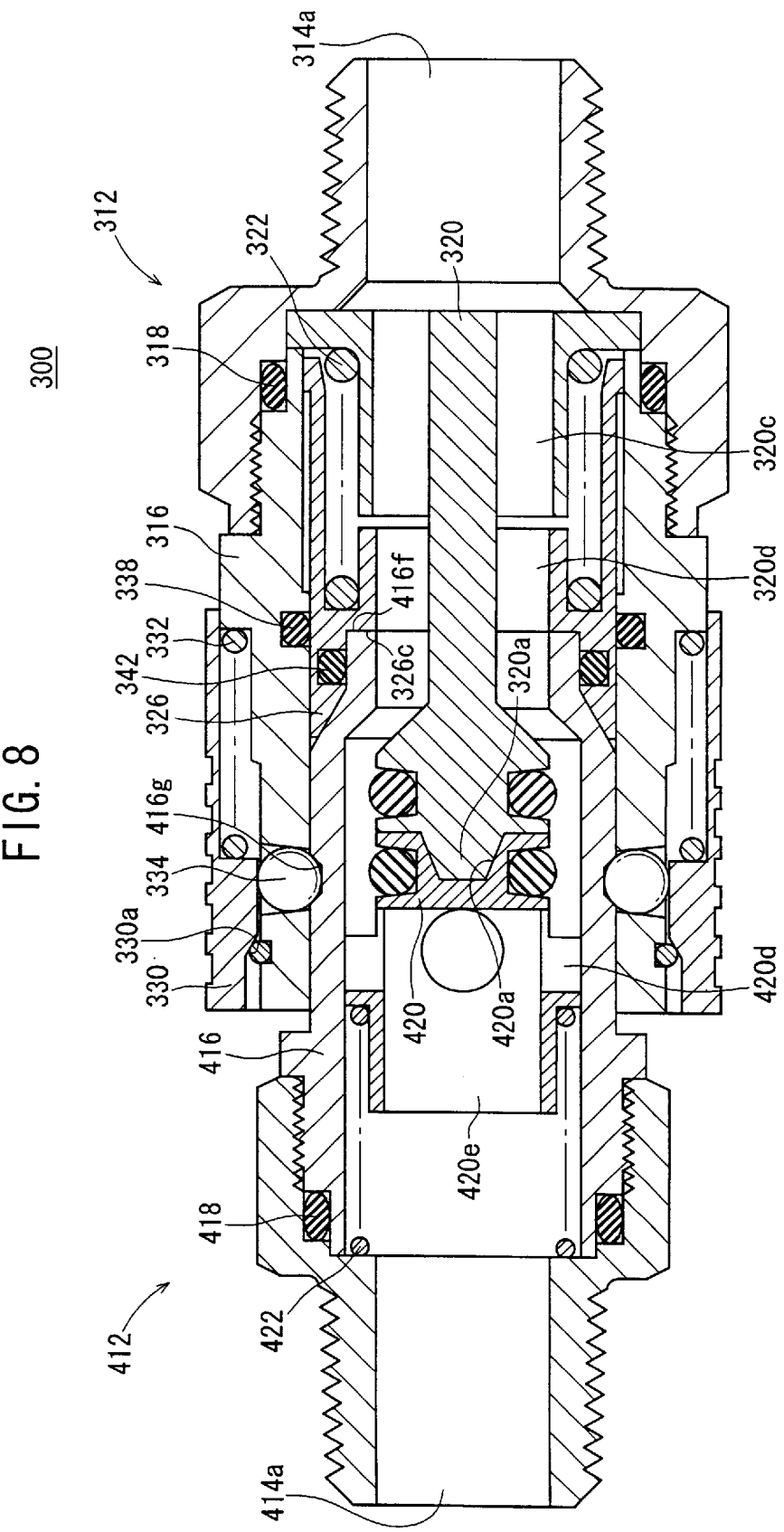
FIG. 8 is a sectional view illustrating a tube joint according to a second embodiment.

As shown in FIG. 8, the tube joint 300 according to the second embodiment comprises a socket 312 and a plug 412.

At first, explanation will be made with reference to FIGS. 9 and 10 for the socket 312 disengaged from the plug 412.

Figure 9:
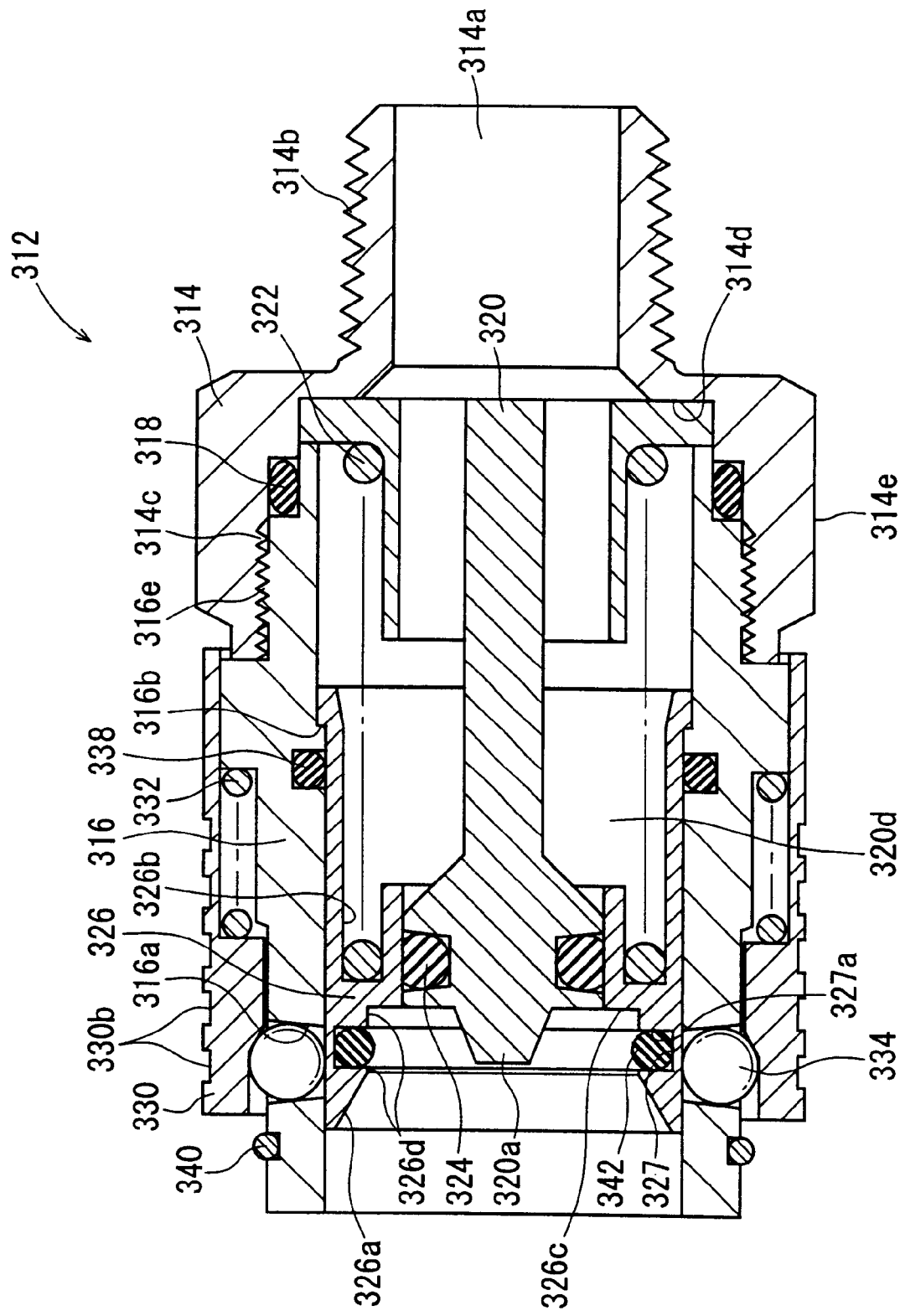
FIG. 9 is a sectional view illustrating a socket in the second embodiment.

As shown in FIG. 9, the socket 312 includes, for example, a back body (rear end joint section) 314 which has a threaded groove 314c on the outer circumference of its front end and which has a step 314d at its inner circumference toward the radial direction, a socket body (main body) 316 which is screwed in the threaded groove 314c of the back body 314, a valve element 320 which is coaxial with the axial center of the socket 312, a plurality of steel balls 334 which are inserted into a plurality of holes 316a each having a diameter gradually reduced near the front end of the socket body 316, a thin cylindrical sleeve 330 which is disposed on the outer side near the front end of the socket body 316 and which is fastened by the steel balls 334 while being urged frontward by a coil spring 332, and a collar (valve body) 326 which provides substantially no gap between the inner circumferential surface of the socket body 316 and a front end columnar section of the valve element 320.

The back body 314 has, at its rear end, an opening 314a and a snap joint 314b connected to a joint of another tube passage. Only the back body 314 of the socket 312 may have a shape adapted to various tube passages to be connected. The outer circumference 314e at the forward end of the back body 314 has a hexagonal cross section which is perpendicular to the axial center. Therefore, it is possible to utilize a tool such as a spanner upon assembling and disassembling.

A female screw (first connecting section) 316e is formed on the outer circumferential surface at the rear end of the socket body 316. The female screw 316e is screwed in the threaded groove 314c of the back body 314 to form the outer circumference of the socket 312. An annular gap is formed between the rear end outer circumference of the socket body 316 and the inner circumferential surface of the back body 314. An O-ring 318, which prevents the fluid from leaking, is installed in the annular gap.

An annular groove is formed on the inner circumferential surface of the socket body 316. An O-ring 338 is attached to the annular groove. The O-ring 338 is pressed by the outer circumferential surface of the collar 326 to keep the liquid tightness (or air tightness).

The plurality of holes 316a are formed at the front ends of the socket body 316. The steel balls 334 are inserted into the holes 316a. The steel balls 334 are internally supported by the outer circumferential surface of the collar 326 and protrude out of the socket body 316. The protruding portions abut against an inclined step 330a of the inner circumferential surface near the front end of the sleeve 330 to serve as stoppers for the sleeve 330.

An annular groove is formed frontward from the hole 316a on the outer circumferential surface of the socket body 316. A stopper ring 340, which functions as a disengagement stopper for the sleeve 330 when the plug 412 is coupled, is disposed in the annular groove.

An annular disk-shaped projection 320b (see FIG. 10), which is disposed at the rear end of the valve element 320, abuts against the step 314d of the back body 314.

An annular and relatively large depression 320d is formed at the substantial center of the axis. A plurality of through-holes 320c, which serve as flow passages, are disposed rearward from the depression 320d. An O-ring (second seal)

324 is disposed in an annular groove which is formed on the outer circumference of the columnar section near the front end. The O-ring 324 is pressed (interposed) by the inner circumferential surface of the collar 326 to prevent the fluid from leaking.

A projection 320a, which has a truncated cone-shaped configuration, is formed on the front end surface of the valve element 320 in order to adjust the axial center upon the connection with the plug 412.

Each of the outer circumferential surface and the inner circumferential surface of the collar 326 is cylindrical and is coaxial with, for example, the socket body 316. The collar 326 is disposed between the inner circumferential surface of the socket body 316 and the outer circumferential surface of the columnar section disposed on the front end of the valve element 320. The collar 326 is open rearward and has a cylindrical groove 326b coaxial with the socket body 316. One end of a coil spring (elastic member) 322 is inserted into the cylindrical groove 326b. The other end of the coil spring 322 abuts against the annular disk-shaped projection 320b of the valve element 320. The coil spring 322 urges the collar 326 frontward. The collar 326 is fastened by the projection 316b disposed on the inner circumferential surface of the socket body 316.

An annular step surface 326c perpendicular to the axial center is formed slightly frontward from the cylindrical groove 326b. An inner circumferential surface 326d, which is parallel to the axial center, is formed in front of the step surface 326c. An O-ring (first seal) 342 is inserted into an annular groove 327 formed on the inner circumferential surface 326d. A tapered surface 326a, the diameter of which is gradually enlarged frontward, is formed frontward from the inner circumferential surface 326d, i.e., at the front end of the collar 326.

Figure 13A:
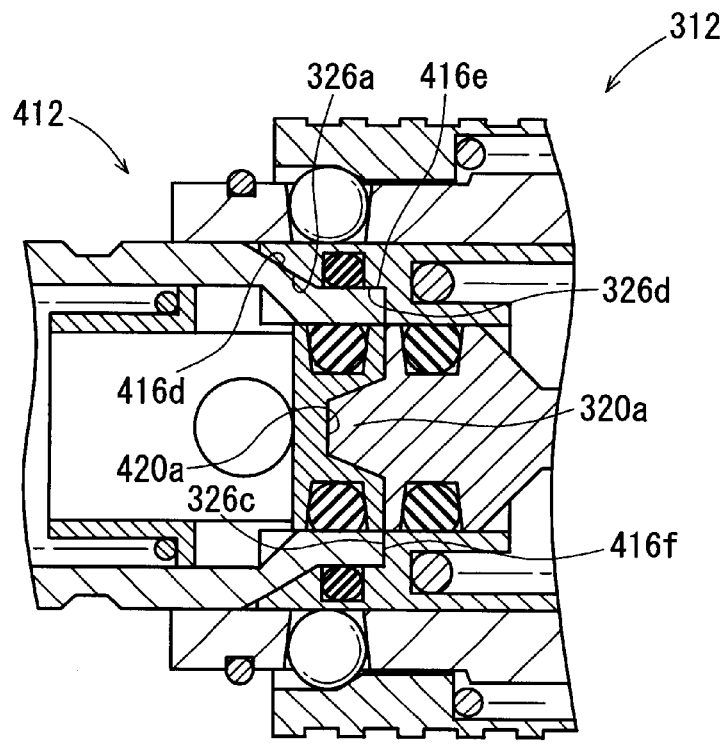
FIGS. 13A and 13B illustrate initial states for connecting the socket and the plug in the second embodiment.
Figure 13B:
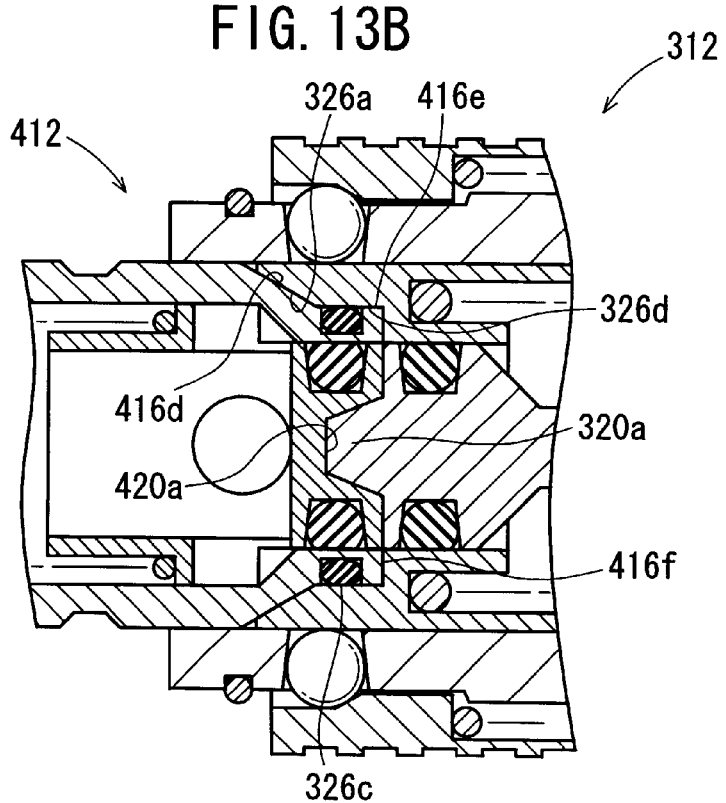
Figure 14:
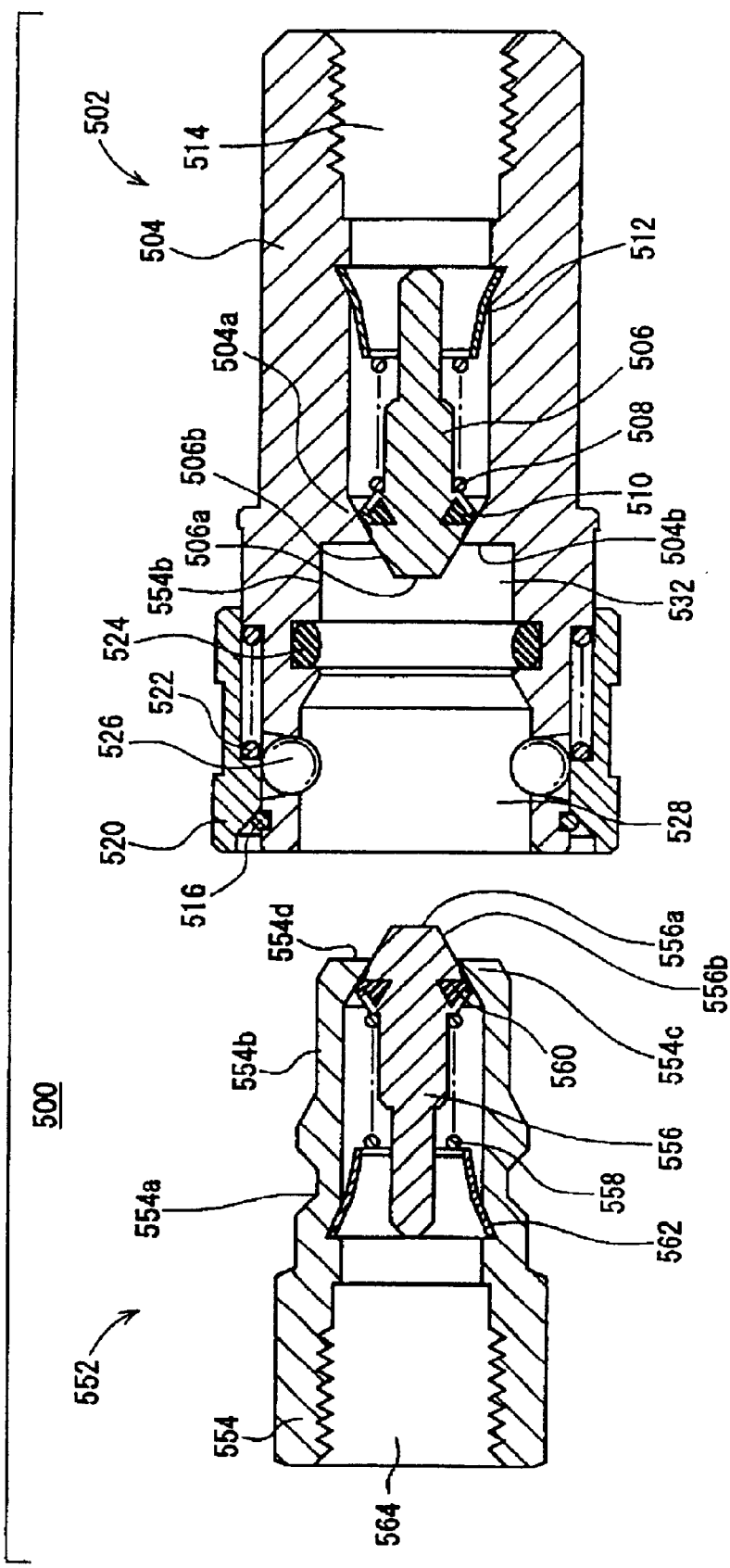
FIG. 14 is a sectional view illustrating a state in which a socket and a plug of a conventional tube joint are disengaged from each other.
Figure 15:
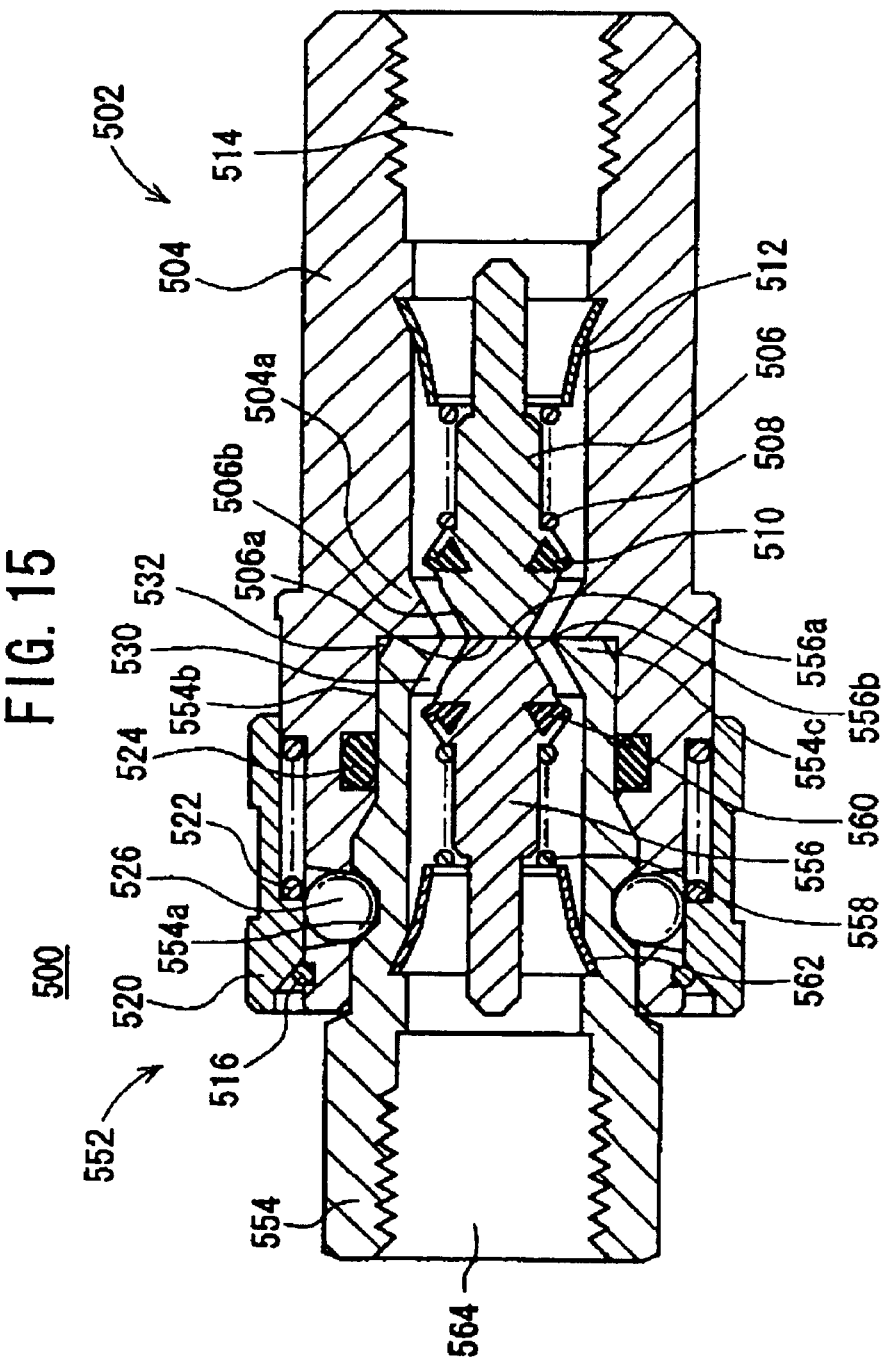
FIG. 15 is a sectional view illustrating a state in which the socket and the plug of the conventional tube joint are connected to one another.

As shown in FIG. 13B, the O-ring 342 may alternatively be disposed on the plug 412. In this case, an outer circumferential annular groove may be formed on the outer circumferential surface 416e of the plug 412 (see FIG. 11) which tightly contacts the inner circumferential surface 326d of the socket 312. The O-ring 342 may be disposed in the outer circumferential annular groove.

A plurality of annular grooves 330b are engraved on the outer circumferential surface of the sleeve 330 so that the socket 312 may be gripped by fingers with ease.

Figure 11:
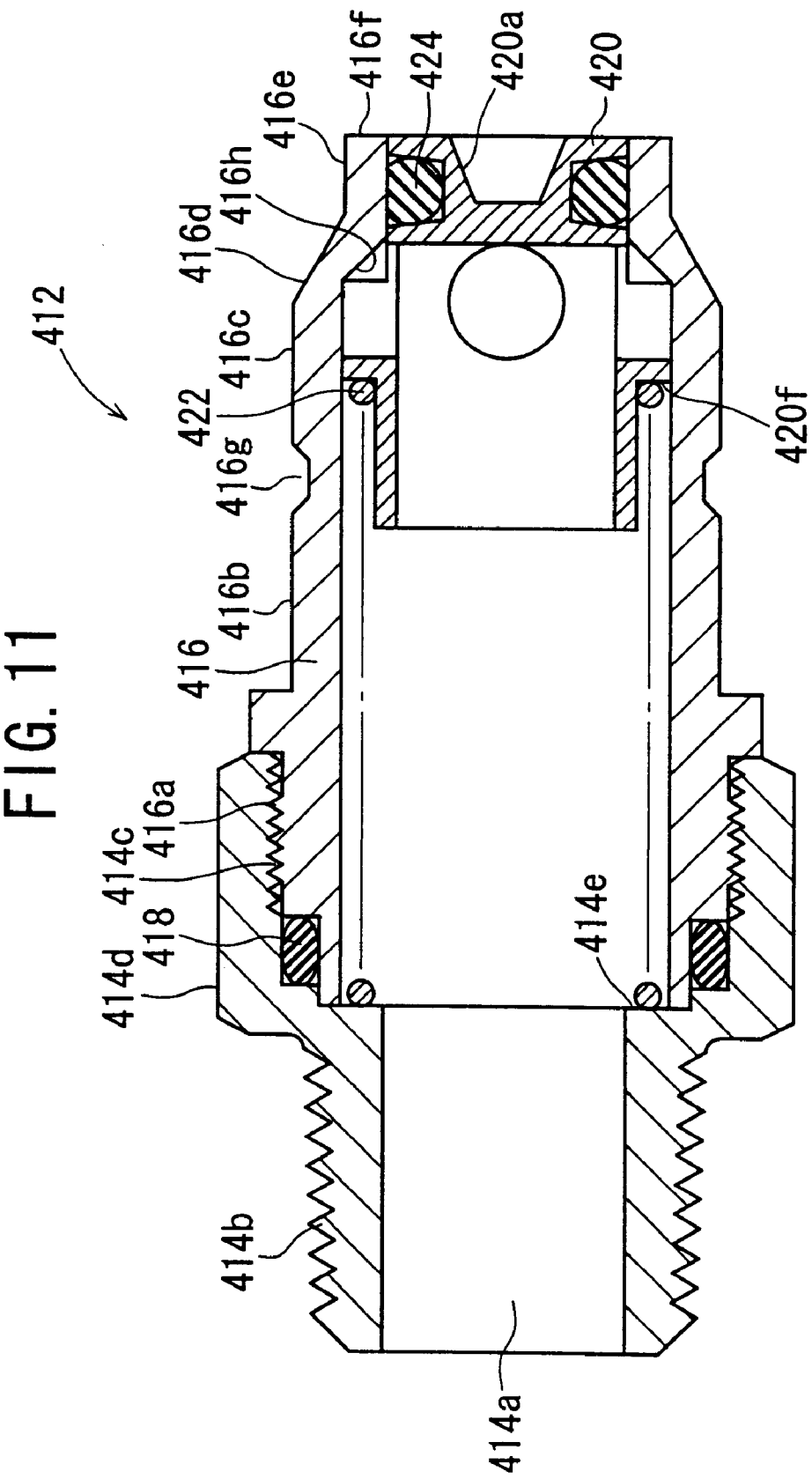
FIG. 11 is a sectional view illustrating a plug in the second embodiment.

Explanation will be made with reference to FIG. 11 for a state in which the plug 412 is disengaged from the socket 312.

The plug 412 includes, for example, a back body (rear end joint section) 414 which has a structure similar to that of the back body 314, a cylindrical plug body (valve body, main body) 416 which is screwed in a threaded groove 414c of the back body 414, and a valve element 420 which is coaxial with the axial center of the plug 412 and which has its outer circumferential surface without substantially any gap with respect to the inner circumferential surface of the plug body 416.

A snap joint 414b is formed at the rear end of the back body 414. The forward end outer circumference 414d of the back body 414 has a hexagonal cross section which is perpendicular to the axial center. Therefore, it is possible to utilize a tool such as a spanner upon assembling and disassembling.

A female screw (second connecting section) 416a is formed on the inner circumferential surface at the rear end of the plug body 416. The female screw 416a is screwed in the threaded groove 414c of the back body 414 to form the outer circumference of the plug 412.

The outer circumferential surfaces 416b, 416c, which are disposed frontward from the female screw 416a, have the same diameter as that of the inner diameter of the socket body 316 at the forward end (see FIG. 9). A widely open annular groove 416g having a trapezoidal cross section is formed between the outer circumferential surfaces 416b, 416c.

A tapered surface 416d, which has its diameter gradually reducing frontward, is formed in front of the outer circumferential surface 416c. The angle of inclination of the tapered surface 416d has approximately the same value as that of the angle of inclination of the tapered surface 326a of the collar (see FIG. 9). An outer circumferential surface 416e, which has an outer diameter of approximately the same length as that of the inner diameter of the inner circumferential surface 326d of the collar 326, is formed in front of the tapered surface 416d. The axially central length L1 (see FIG. 12A) of the outer circumferential surface 416e is approximately the same as the length of the inner circumferential surface 326d. A flat front end surface 416f is formed at the front end of the plug body 416. Each of the inner diameter and the outer diameter of the front end surface 416f is the same as the diameter of the step surface 326c of the collar 326. A tapered surface 416h, which is substantially parallel to the tapered surface 416d, forms the inner circumferential surface in the tapered surface 416d.

An annular gap is formed between rear end outer circumference of the plug body 416 and the inner circumferential surface of the back body 414. An O-ring 418, which prevents the fluid from leaking, is attached to the annular gap.

The valve element 420 has a large diameter section 420b (see FIG. 10) and a columnar section 420c which is disposed at the front end. An O-ring (second seal) 424 is disposed in an annular groove formed on the columnar section 420c. The O-ring 424 is pressed by the inner circumferential surface of the front end of the plug body 416 to keep the liquid tightness (or air tightness).

Figure 10:
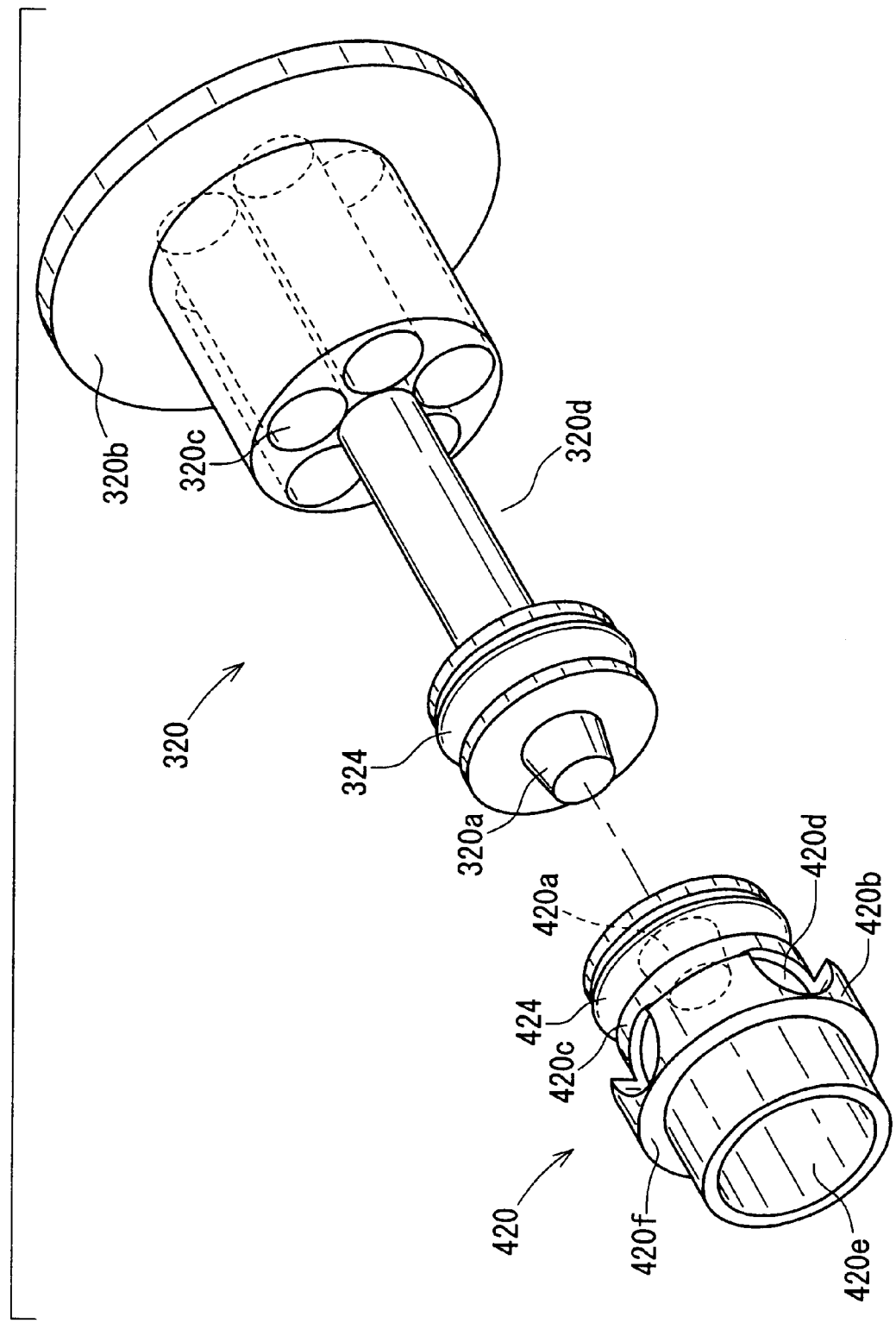
FIG. 10 is a perspective view illustrating a valve element in the second embodiment.

As shown in FIG. 10, a plurality of holes 420d are formed at radial portions including the large diameter section 420b and the columnar section 420c. The holes 420d are communicated with an axially central bore 420e open at the rear end surface of the valve element 420.

The outer diameter of the front end surface of the valve element 420 is the same as the outer diameter of the front end surface of the valve element 320. A recess 420a, which has a truncated cone-shaped configuration, is fitted to the projection 320a without substantially any gap in order to mutually adjust the axial center upon the connection with the plug 412.

A step 420f is formed at the back of the large diameter section 420b. As shown in FIG. 11, the step 420f supports one end of the coil spring 422.

The other end of the coil spring 422 abuts against the inner circumferential step 414e of the back body 414 to urge the valve element 420 frontward. The valve element 420 is fastened by a tapered surface 416h which is formed on the inner circumferential surface of the plug body 416.

Explanation will be made with reference to FIGS. 12A to 13A for the operation to provide connection and disengagement for the socket 312 and the plug 412. A flexible hose tube passage is connected to each of the snap joints 314b, 414b of the socket 312 and the plug 412. The interior of each of the socket 312 and the plug 412 is previously filled with the fluid (liquid or gas).

Figure 12A:
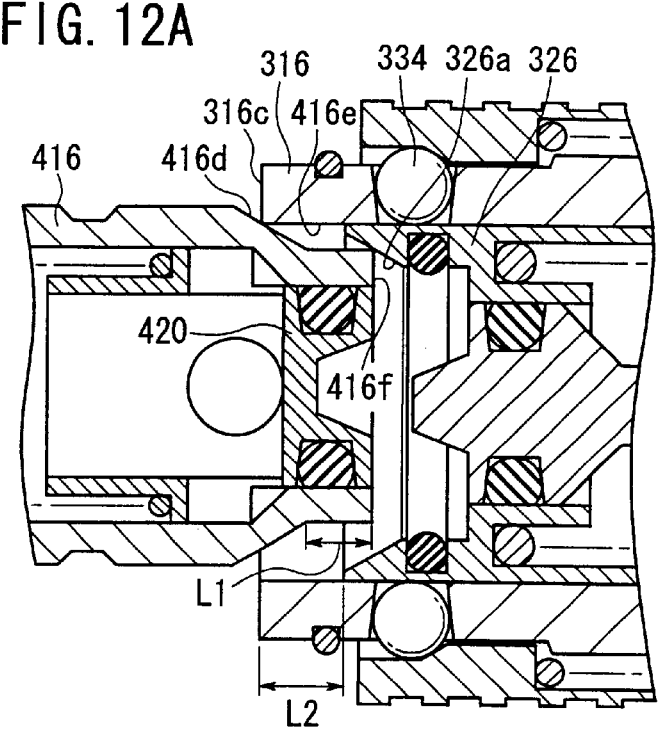
FIG. 12A illustrates a state in which the axial center of the socket is deviated from the axial center of the plug in the second embodiment.

The front end of the socket 312 abuts against the front end of the plug 412. As shown in FIG. 12A, even when the axial center of the socket 312 is deviated from the axial center of the plug 412, the plug 412 is inserted into the socket 312, while the front end surface 416f of the plug 412 is guided by the tapered surface 326a of the socket 312. Therefore, the socket 312 is reliably fitted to the plug 412.

The length L1 of the outer circumferential surface 416e is slightly shorter than the length L2 ranging from the forward end of the collar 326 to the forward end 316c of the socket body 316. Therefore, even when the collar 326 is forcibly moved by the outer circumferential surface 416e, the tapered surface 416d of the plug body 416 abuts against the forward end of the socket body 316 before the collar 326 is moved. Therefore, it is possible to prevent the collar 326 from moving with the socket 312 being inadequately meshed with the plug 412. Therefore, the fluid in the socket 312 does not leak when the socket 312 is connected to the plug 412.

Figure 12B:
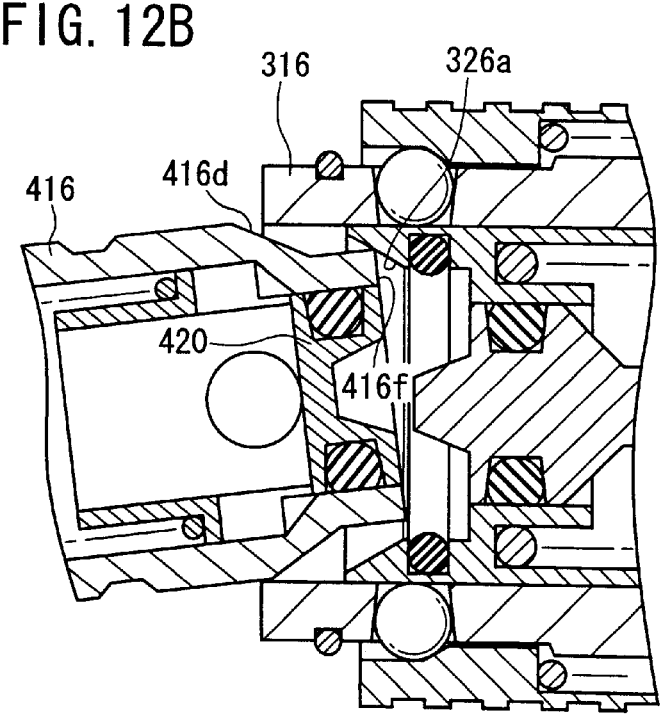
FIG. 12B illustrates a state in which the axial center of the socket is not parallel to the axial center of the plug in the second embodiment.

As shown in FIG. 12B, even when the axial center of the socket 312 is not parallel to the axial center of the plug 412, it is possible to prevent the collar 326 from moving with the socket 312 being inadequately meshed with the plug 412, owing to the guiding action of the tapered surface 326a or the tapered surface 416d. When the front end of the socket 312 is meshed with the front end of the plug 412, the projection 320a, the step surface 326c, the inner circumferential surface 326d, and the tapered surface 326a of the socket 312 tightly contacts the recess 420a, the front end surface 416f, the outer circumferential surface 416e, and the tapered surface 416d of the plug 412 respectively as shown in FIG. 13A. The O-ring 342 is pressed and deformed by the outer circumferential surface 416e, and the liquid-tight state is established around the O-ring 342. The projection 320a disposed on the front end surface of the valve element 320 is fitted to the recess 420a disposed on the front end surface of the valve element 420. Therefore, the axial center of the socket 312 is reliably adjusted to the axial center of the plug 412.

When the plug 412 is inserted into the socket 312, the collar 326 compresses the coil spring 322 to move rearward. The valve element 420 compresses the coil spring 422 to move rearward. Therefore, when the socket 312 and the plug 412 are connected to one another, no liquid leaks.

The O-ring 324 for keeping the liquid tightness (or air tightness) at the front of the socket 312 and the O-ring 424 for keeping the liquid tightness (or air tightness) at the front of the plug 412 are separated from the inner circumferential surface of the collar 326 and the inner circumferential surface of the plug body 416 respectively. The sealing function is disabled, and the flow passage of the socket 312 is communicated with the flow passage of the plug 412. Then, the O-ring 342 effects the external sealing function.

When the plug 412 is deeply inserted to completely couple the plug 412 to the socket 312, the steel balls 334 are positioned in the annular groove 416g of the plug body 416 as shown in FIG. 8. Therefore, the steel balls 334 are inward movable. The steel balls 334 are urged by the coil spring 332 and the inclined step 330a of the sleeve 330. Therefore, the steel balls 334 are moved inward by the inclined surface of the step 330a and are accommodated inward from the outer circumferential surface of the socket body 316.

When the steel balls 334 are accommodated inward from the socket body 316, the sleeve 330 is frontward moved. The sleeve 330 is fastened by the stopper ring 340 which is formed at the front position. The outer circumferences of the steel balls 334 are covered with the inner circumferential surface of the sleeve 330. Therefore, the steel balls 334 are held inward.

The steel balls 334 enter the annular groove 416g of the plug body 416. Therefore, the plug 412 is not disengaged from the socket 312.

A flow passage is formed between the opening 314a formed at the rear end of the socket 312 and the opening 414a formed at the rear end of the plug 412 via the through-holes 320c and the depression 320d of the valve element 320, and the holes 420d and the bore 420e of the valve element 420. The flow passage is kept liquid-tight (or air-tight) by the O-rings 318, 338, 342, 418.

The front end surface of the valve element 320 and the front end surface of the valve element 420 have the same outer diameter, and the entire surfaces tightly contacts each other. Therefore, the areal size of the flow passage and the direction of the flow passage for the fluid flowing around the valve elements 320, 420 are constant. The pressure loss of the fluid scarcely occurs.

Explanation will be made for the operation to disengage the plug 412 from the socket 312.

When the force is applied to the sleeve 330 to move the sleeve 330 rearward, the steel balls 334 are movable outward. The steel balls 334 are urged by the coil springs 322, 422 and the inclined surface of the annular groove 416g of the plug body 416. Therefore, the steel balls 334 are extruded outward by the inclined surface of the annular groove 416g and protrude out of the socket body 316.

When the steel balls 334 protrude outward from the annular groove 416g, the collar 326 is moved while extruding the plug body 416 frontward. The socket 312 is disengaged from the plug 412. The valve element 420 is also urged by the coil spring 422. Therefore, the valve element 320 is extruded to disengage the socket 312 from the plug 412.

The step surface 326c and the front end surface 416a tightly contact each other. The projection 320a and the recess 420a also tightly contact each other until they are disengaged. Therefore, any gap is scarcely formed therebetween and no fluid leaks when the socket 312 is disengaged from the plug 412.

When the socket 312 is disengaged from the plug 412, the sleeve 330 is fastened by the steel balls 334 again and is located rearward.

According to the tube joint 300 of the second embodiment, when the socket 312 is disengaged from the plug 412, the front end surface 416f, the recess 420a, and the outer circumferential surface 416e tightly contact the step surface 326c, the projection 320a, and the inner circumferential surface 326d respectively as shown in FIG. 13A. Therefore, there is no space for drawing the fluid with which the interior of the tube joint 300 is filled and no fluid externally leaks. Specifically, the fluid in the socket 312 is externally closed by the collar 326, the valve element 320, and the O-ring 324. The fluid in the plug 412 is also externally closed by the plug body 416, the valve element 420, and the O-ring 424. Therefore, no fluid leaks.

When the socket 312 is connected to the plug 412, then the front end surface of the valve element 320 and the front end surface of the valve element 420 have the identical outer diameter, and the entire surfaces tightly contact each other. Therefore, the areal size of the flow passage and the direction of the flow passage for the fluid flowing around the valve elements 320, 420 are constant. The pressure loss of the fluid scarcely occurs.

The O-ring 324, which keeps the liquid tightness (or air tightness) for the socket 312, is disposed on the valve element 320 as selected from the outer collar 326 and the inner valve element 320. Therefore, the outer collar 326 may have an arbitrary shape. Therefore, the groove 326b can be formed in the collar 326. The coil spring 322, which has a long natural length, can be used and inserted into the groove 326b. The groove 326b also serves as a disengagement stopper for the coil spring 322.

The collar 326 has the tapered surface 326a at the front end. Therefore, even when the axial center of the socket 312 is not coincident with the axial center of the plug 412 when the socket 312 and the plug 412 are connected to one another, the front end surface 416f of the plug 412 is guided by the tapered surface 326a. The socket 312 can be correctly meshed with the plug 412. The tapered surface 416d of the plug 412 and the forward end 316c of the socket 312 also make the guide when the socket 312 and the plug 412 are meshed with each other.

The tube joint according to the present invention is not limited to the embodiments described above, which may be embodied in other various forms without deviating from the gist or essential characteristics of the present invention.

What is claimed is:

1. A tube joint for a fluid, comprising a socket and a plug which is connected to and disengaged from said socket, wherein said socket comprises:

an outflow-preventive valve for closing a passage for said fluid with a cylindrical valve body which is coaxial with said socket and a valve element which is disposed in said valve body when said socket and said plug are disengaged from each other, said valve body being displaceable with respect to said socket, wherein a first seal is provided for sealing said socket and said plug before said valve body and said valve element are relatively moved when said socket and said plug are connected with each other, and wherein said valve body of said socket comprises an inner circumferential surface and a tapered surface having a gradually increasing diameter in a direction away from said inner circumferential surface, and wherein said first seal is disposed on one of an inner circumferential annular groove formed in said inner circumferential surface and an outer circumferential annular groove formed on a valve body of said plug.

2. The tube joint according to claim 1, wherein a valve body of said plug and said valve body of said socket contact each other, and a valve element of said plug and said valve element of said socket contact each other, thereby preventing said fluid from externally leaking when said socket and said plug are disengaged from each other and said outflow-preventive valve closes said passage for said fluid.

3. The tube joint according to claim 1, wherein one of said socket and said plug includes a detachable mechanism for said socket and said plug to be coupled to and disengaged from each other.

4. The tube joint according to claim 1,
wherein said valve element has a second seal on an outer circumference of a front end columnar section thereof, and
wherein said second seal is interposed by an inner circumferential surface of said valve body and an outer circumferential surface of said valve element, thereby preventing said fluid from externally flowing when said socket and said plug are not coupled to one another.

5. The tube joint according to claim 1, wherein said valve element has one of a projection and a recess, for adjusting an axial center of said socket with respect to said plug, being formed on an end surface of said valve element, said end surface being coupled to said plug.

6. The tube joint according to claim 1, further comprising:
a cylindrical groove which is open rearward between an inner circumferential surface and an outer circumferential surface of said valve body,
wherein one end of an elastic member for urging said valve body in an axial direction of said socket or said plug is inserted into said cylindrical groove.

7. The tube joint according to claim 1,
wherein each of said socket and said plug has a rear end joint section at each rear end thereof, said rear end joint section being connected with another tube joint, and
wherein a first connecting section for connecting a main body of said socket to said rear end joint section has the same shape as the shape of a second connecting section for connecting a main body of said plug to said rear end joint section.

8. The tube joint according to claim 1,
wherein each of said socket and said plug has a rear end joint section at each rear end thereof, said rear end joint section being connected with another tube joint, and
wherein said rear end joint section has a hexagonal cross section which is perpendicular to an axial center.

* * * * *